(12) United States Patent
Takada

(10) Patent No.: US 12,380,534 B2
(45) Date of Patent: Aug. 5, 2025

(54) TRAINING APPARATUS, TRAINING METHOD, AND MEDIUM

(71) Applicant: CANON KABUSHIKI KAISHA, Tokyo (JP)

(72) Inventor: Yosuke Takada, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 552 days.

(21) Appl. No.: 17/847,232

(22) Filed: Jun. 23, 2022

(65) Prior Publication Data

US 2022/0414827 A1 Dec. 29, 2022

(30) Foreign Application Priority Data

Jun. 24, 2021 (JP) ................... 2021-105035

(51) Int. Cl.
  *G06T 3/4046* (2024.01)
  *G06T 3/4015* (2024.01)
  *G06T 7/00* (2017.01)

(52) U.S. Cl.
  CPC .......... *G06T 3/4046* (2013.01); *G06T 3/4015* (2013.01); *G06T 7/0002* (2013.01); *G06T 2207/10024* (2013.01); *G06T 2207/20081* (2013.01); *G06T 2207/20084* (2013.01); *G06T 2207/30168* (2013.01)

(58) Field of Classification Search
  CPC .... G06T 3/4046; G06T 3/4015; G06T 7/0002
  See application file for complete search history.

(56) References Cited

U.S. PATENT DOCUMENTS

| 7,200,279 B1* | 4/2007 | Lin ................. H04N 9/646 |
| | | 345/589 |
| 10,846,880 B1* | 11/2020 | Peterson ............ B66F 11/046 |
| 11,189,375 B1* | 11/2021 | O'Connor ............. G16H 30/40 |
| 2012/0127334 A1* | 5/2012 | Imai ................. H04N 23/843 |
| | | 348/E9.051 |
| 2018/0286023 A1* | 10/2018 | Zhu ..................... G06T 7/11 |
| 2020/0167972 A1* | 5/2020 | Birnhack ............ G06N 3/045 |
| 2020/0211169 A1* | 7/2020 | Tsutsumi ........... G01N 21/9501 |
| 2021/0035354 A1* | 2/2021 | Williams ............ G01B 11/303 |
| 2021/0073648 A1* | 3/2021 | Lichenstein .......... G06V 10/82 |

(Continued)

FOREIGN PATENT DOCUMENTS

JP 2021-087201 A 6/2021

OTHER PUBLICATIONS

Michael Gharbi et al., "Deep joint demosaicking and denoising" ACM Transactions on Graphics (Dec. 2016) pp. 1-12, vol. 35, Issue 6, Article No. 191.

(Continued)

*Primary Examiner* — Kevin Ky
(74) *Attorney, Agent, or Firm* — Carter, DeLuca & Farrell LLP

(57) ABSTRACT

A training apparatus is provided. The training apparatus acquires a mosaic image, generates a demosaic image by subjecting the mosaic image to a demosaicing process in which a neural network is used, and detects a low-image-quality portion in the demosaic image as a detected region. The training apparatus acquires a training image including a region having a hue similar to a hue of the detected region, and incrementally trains the neural network using the training image.

12 Claims, 10 Drawing Sheets

(56) References Cited

U.S. PATENT DOCUMENTS

| | | | |
|---|---|---|---|
| 2021/0073957 A1* | 3/2021 | Slabaugh | G06T 5/90 |
| 2021/0158479 A1* | 5/2021 | Vinogradov | G06T 7/90 |
| 2021/0264161 A1* | 8/2021 | Saraee | G06F 18/2413 |
| 2021/0374527 A1 | 12/2021 | Takada | |
| 2022/0092357 A1 | 3/2022 | Takada | |
| 2022/0207648 A1* | 6/2022 | Petersson | G06T 3/4046 |
| 2022/0237830 A1* | 7/2022 | Khodadadeh | G06N 3/045 |
| 2022/0391633 A1* | 12/2022 | Harikumar | G06V 10/82 |
| 2022/0414827 A1* | 12/2022 | Takada | G06T 7/0002 |
| 2023/0065837 A1* | 3/2023 | Venkatesan | G06T 3/4046 |
| 2024/0357247 A1* | 10/2024 | Kobayashi | B60R 11/02 |
| 2024/0428593 A1* | 12/2024 | Fujimoto | G06V 10/7715 |
| 2024/0430573 A1* | 12/2024 | Lablans | H04N 23/58 |
| 2025/0004862 A1* | 1/2025 | Rasal | G06N 20/00 |
| 2025/0005718 A1* | 1/2025 | Imber | G06N 3/045 |

OTHER PUBLICATIONS

Notice of Reasons for Refusal issued by the Japanese Patent Office on Mar. 21, 2025 in corresponding JP Patent Application No. 2021-105035, with English translation.

* cited by examiner

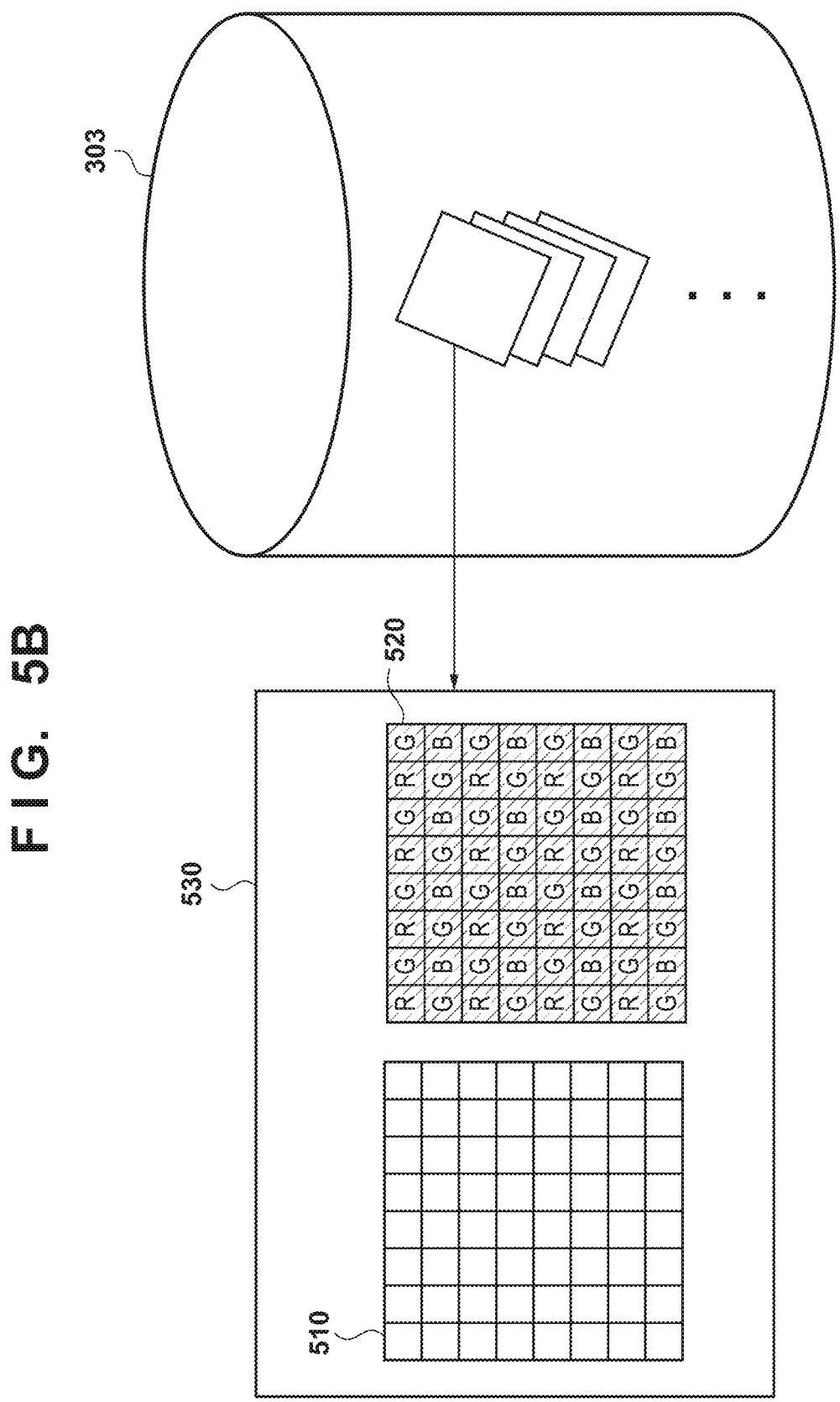

FIG. 8

| NUMBER | HUE 1 | HUE 2 |
|---|---|---|
| 1 | 125 | 0 |
| 2 | 125 | 5 |
| 3 | 125 | 10 |
| ⋮ | ⋮ | ⋮ |
| 35 | 125 | 175 |
| 36 | 50 | 0 |
| 37 | 50 | 5 |
| ⋮ | ⋮ | ⋮ |
| 105 | 90 | 175 |

TRAINING APPARATUS, TRAINING METHOD, AND MEDIUM

BACKGROUND OF THE INVENTION

Field of the Invention

The present invention relates to a training apparatus, a training method, and a medium, and particularly relates to an image demosaicing process.

Description of the Related Art

Through a color filter, light of a specific wavelength enters each pixel of an image sensor used in a digital image-capturing apparatus such as a digital camera. For example, if a color filter having a Bayer pattern is used, mosaic image data in which each pixel has a pixel value corresponding to one of the colors R, G, and B can be obtained from the image sensor. Then, color image data in which each pixel has pixel values respectively corresponding to the plurality of colors can be obtained by performing, for each pixel of the mosaic image data, various types of signal processing such as a demosaicing process for obtaining pixel values corresponding to the two other colors.

As one method for the demosaicing process, there is a method of performing linear interpolation or nonlinear interpolation based on pixel values of the same color in the neighborhood. As another method for the demosaicing process, an interpolation method in which deep learning technology is used has been proposed by Gharbi (Michael Gharbi et al. "Deep Joint Demosaicking and Denoising", ACM Transactions on Graphics, Vol. 35, Issue 6, Article No.: 191 (2016).). Specifically, Gharbi discloses a method of extracting, from training data, only some difficult data with which artifacts, etc., occur when demosaicing is performed, and training a CNN-based demosaicing network based on the difficult data.

SUMMARY OF THE INVENTION

According to an embodiment of the present invention, a training apparatus comprises one or more processors and one or more memories storing one or more programs which cause the one or more processors to: acquire a mosaic image; generate a demosaic image by subjecting the mosaic image to a demosaicing process in which a neural network is used; detect a low-image-quality portion in the demosaic image as a detected region; acquire a training image including a region having a hue similar to a hue of the detected region; and incrementally train the neural network using the training image.

According to another embodiment of the present invention, a training method comprises: acquiring a mosaic image; generating a demosaic image by subjecting the mosaic image to a demosaicing process in which a neural network is used; detecting a low-image-quality portion in the demosaic image as a detected region; acquiring a training image including a region having a hue similar to a hue of the detected region; and incrementally training the neural network using the training image.

According to still another embodiment of the present invention, a non-transitory computer-readable medium stores a program which, when executed by a computer comprising a processor and a memory, causes the computer to: acquire a mosaic image: generate a demosaic image by subjecting the mosaic image to a demosaicing process in which a neural network is used; detect a low-image-quality portion in the demosaic image as a detected region; acquire a training image including a region having a hue similar to a hue of the detected region; and incrementally train the neural network using the training image.

Further features of the present invention will become apparent from the following description of exemplary embodiments (with reference to the attached drawings).

BRIEF DESCRIPTION OF THE DRAWINGS

FIGS. 5A and 5B are diagrams illustrating one example of a training dataset construction method.

FIG. 8 is a diagram illustrating one example of a hue information file.

DESCRIPTION OF THE EMBODIMENTS

Figure 1:
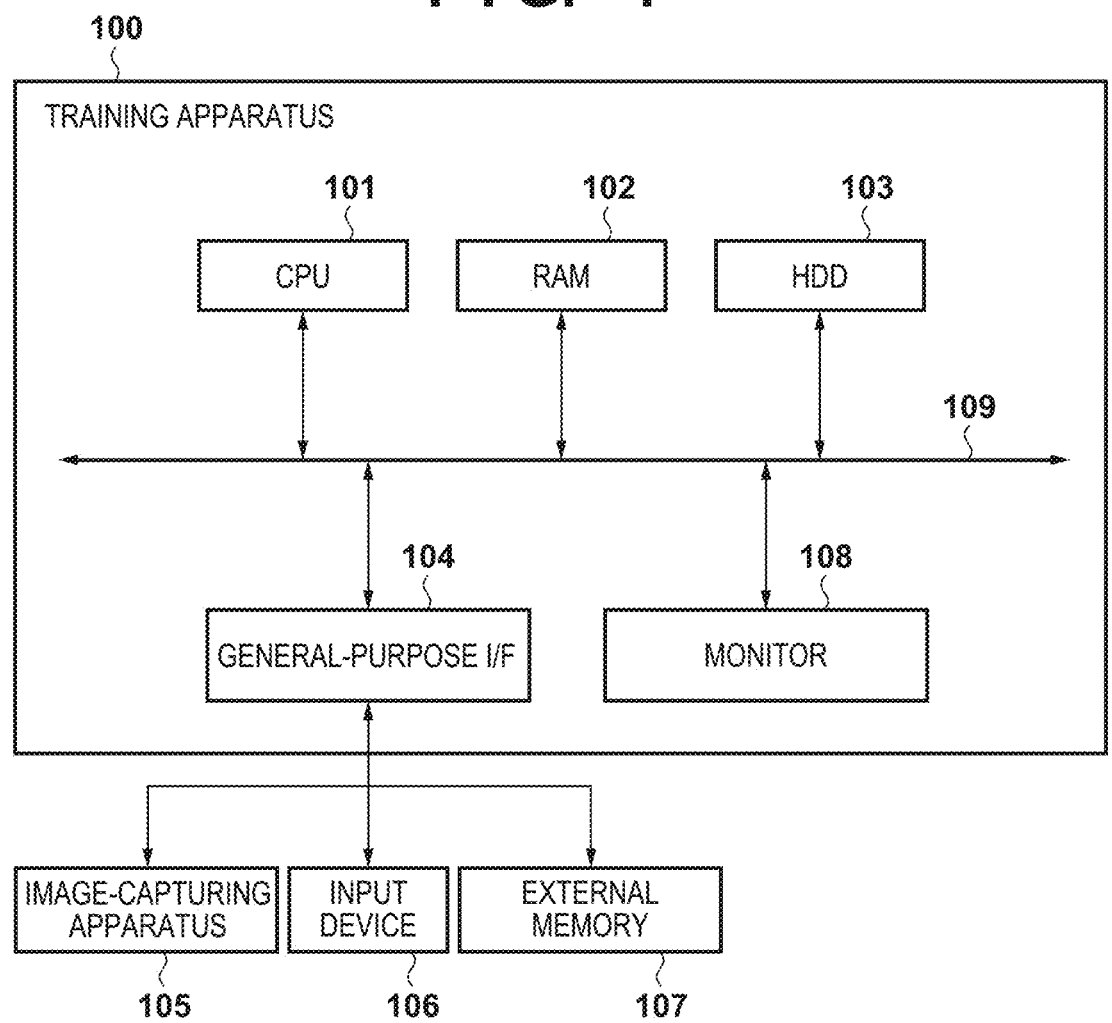
FIG. 1 is a block diagram illustrating an example of a hardware configuration of a training apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

The present inventor found out that, while false color and moiré are less likely to occur with a demosaicing process in which a neural network, such as the deep learning disclosed in Gharbi, is used, a false pattern that does not originally exist is likely to occur with such a demosaicing process.

According to an embodiment of the present invention, the occurrence of a false pattern can be suppressed in a demosaicing process in which a neural network is used.

Embodiment 1

(CNN)

A training apparatus according to an embodiment performs a demosaicing process in which a neural network is used. First, a convolutional neural network (CNN) will be described as one example of a neural network that can be used in an embodiment. CNNs are used in Gharbi and in image processing techniques to which deep learning technology is applied. A CNN is a training-based image processing technique in which a process is repeated in which a nonlinear computation is performed after convolution of filters and image data. The filters are also called local receptive fields (LPFs). The image data obtained by performing a nonlinear computation after convolution of the filters and image data is called feature maps. Furthermore, the filters are generated through training (learning). The training is performed using training data (training images or data sets) consisting of a pair of input image data and output image data. Simply stated, the training refers to a process for generating, from training data, values of the filters that can accurately convert input image data into corresponding output image data. This will be described in detail later.

If the image data has a plurality of color channels (for example, R, G, and B) or the feature maps are formed from a plurality of pieces of image data, the filters used for convolution may also have a corresponding number of channels. That is, the filters are expressed by a four-dimensional array having a dimension that is the number of channels, in addition to dimensions that are the vertical and horizontal sizes, and the number of filters. The process in which a nonlinear computation is performed after convolution of the filters and image data (or feature maps) is expressed as a unit which is called a layer. For example, a specific feature map and a specific filter are respectively called a feature map of an $n^{th}$ layer and a filter of the $n^{th}$ layer. Furthermore, a CNN in which a set consisting of convolution of filters and image data, and a nonlinear computation is repeated three times, for example, is referred to as a CNN having a three-layer network structure.

Such a combination of convolution and nonlinear computation can be expressed using Formula (1) below.

[Math. 1]

$$X_n^{(l)} = f\left(\sum_{k=1}^{K} W_n^{(l)} * X_{n-1}^{(l)} + b_n^{(l)}\right) \quad (1)$$

In Formula (1), $W_n$ indicates a filter of the $n^{th}$ layer, bn indicates a bias of the $n^{th}$ layer, f indicates a nonlinear operator, $X_n$ indicates a feature map of the $n^{th}$ layer, and * indicates a convolution operator. Note that (l) indicates that the filter or feature map is the $l^{th}$ filter or feature map. The filters and biases are generated through the later-described training, and are also collectively referred to as network parameters.

While the type of nonlinear computation to be used is not particularly limited, a sigmoid function or a rectified linear unit (ReLU) can be used, for example. A nonlinear computation according to ReLU can be expressed using Formula (2) below.

[Math. 2]

$$f(X) = \begin{cases} X & \text{if } 0 \le X \\ 0 & \text{otherwise} \end{cases} \quad (2)$$

That is, a ReLU process is a nonlinear process in which negative element values of an input vector X are converted into zero, and positive element values of the input vector X are left as-is.

Next, training of a CNN will be described. A CNN can be trained by minimizing an objective function that can be obtained for training data consisting of a combination of an input image (training input image) and a corresponding output image (supervisory image). The objective function can be expressed using Formula (3) below, for example.

[Math. 3]

$$L(\theta) = \frac{1}{n}\sum_{i=1}^{n}\|F(X_i;\theta) - Y_i\|_2^2 \quad (3)$$

Here, the objective function L is a loss function for measuring the error between a correct answer (i.e., an output image) and an inference (i.e., a result of the CNN process for an input image). Furthermore, $Y_i$ and $X_i$ respectively indicate the $i^{th}$ output image and the $i^{th}$ input image. F is a function collectively expressing the computations (Formula (1)) performed in the CNN layers. θ indicates the network parameters (filters and biases). Furthermore, $\|Z\|_2$ indicates the L2 norm of a vector Z, and, simply stated, is the square root sum of squares of the elements of the vector Z. In the objective function in Formula (3), the square of the L2 norm is used. Furthermore, n is the number of pieces of training data (sets of an input image and an output image) used for training. Typically, the total number of pieces of training data is large. Thus, in training in which the stochastic gradient descent (SGD) is used, some pieces of training data can be randomly selected and used to minimize the objective function. According to such a method, the calculation load in training in which a large quantity of training data is used can be reduced.

Various methods, such as the momentum method, AdaGrad method, AdaDelta method, and Adam method, can be used as the method for minimizing (optimizing) the objective function. For example, the Adam method according to Formula (4) below can be adopted.

[Math. 4]

$$g = \frac{\partial L}{\partial \theta_i^t} \quad (4)$$

$$m = \beta_1 m + (1-\beta_1)g$$

$$v = \beta_2 v + (1-\beta_2)g^2$$

$$\theta_i^{t+1} = \theta_i^t - \alpha \frac{\sqrt{1-\beta_2^t}}{(1-\beta_1^t)} \frac{m}{(\sqrt{v}+\in\varepsilon)}$$

In Formula (4), $\theta_i^t$ indicates the $i^{th}$ network parameters in the $t^{th}$, iteration, and g is the gradient of the loss function L with respect to $\theta_i^t$ Furthermore, m and v are moment vectors, α is the base learning rate, $\beta_1$ and $\beta_2$ are hyper parameters, and ε is a small constant that can be set as appropriate. While the optimization method to be used is not particularly limited, the optimization method to be used can be selected in accordance with the purpose, etc., because it is known that optimization methods are different from one another in terms of convergence and also give rise to a difference in training time.

The specific CNN configuration is not particularly limited. ResNet used in the field of image recognition, RED-Net used in the field of super-resolution, etc., can be mentioned as examples of specific configurations of networks in which CNNs are used. In any case, processing accuracy is increased by using a multilayer CNN and performing filter convolution many times. For example, ResNet has a network structure including a path for shortcutting convolution layers, and realizes high-accuracy recognition coming close to the human recognition rate by a multilayer network of 152 layers. Note that, simply stated, the reason why processing accuracy is increased by a multilayer CNN is because the CNN can express the nonlinear relation between input and output by repeating nonlinear computation many times.

(Configuration of Training Apparatus)

Figure 12A:
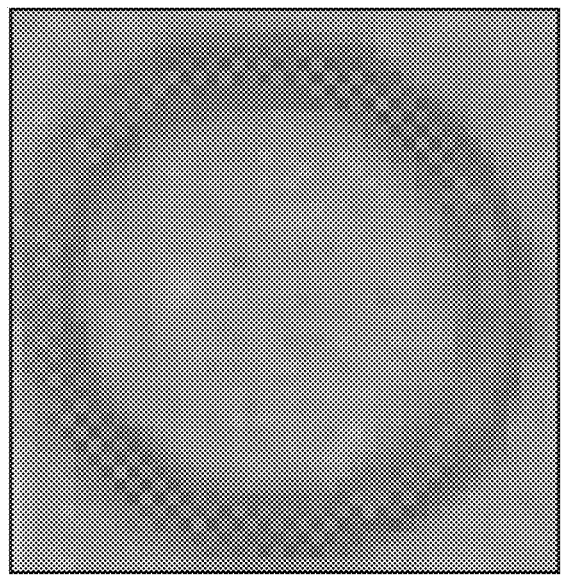
FIGS. 12A and 12B are diagrams illustrating one example of a false pattern.
Figure 12B:
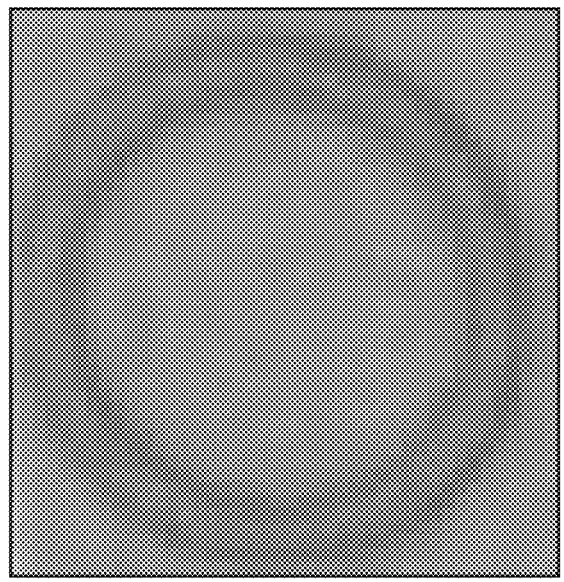

A training apparatus according to the present embodiment detects an image defect that may occur when a demosaicing process is performed using a neural network or deep learning, and incrementally trains a neural network by creating training data so that this image defect can be suppressed. As mentioned above, the present inventor found out that, while image defects such as false color and moiré are excellently suppressed when a demosaicing process is performed using a neural network or deep learning, a new image defect such as a false pattern is likely to occur with such a demosaicing process. One example of a false pattern is illustrated in FIG. 12A. FIG. 12A illustrates the result when RAW image data indicating a circle was subjected to a demosaicing process using a neural network, and FIG. 12B illustrates the result when the RAW image data was subjected to a typical demosaicing process without using a neural network. As can be seen in FIG. 12A, a checkered false pattern is formed following a Bayer pattern in the demosaic image obtained using a neural network. The reason for this is because data-driven processing such as a neural network or deep learning has been performed, and specifically, it can be considered that the image defect has occurred due to an insufficiency in training data amount, training data bias, training order, or the like. In the present embodiment, the occurrence of a false pattern in a demosaicing process in which a neural network is used can be suppressed by feeding back a detected image defect to the neural network and performing incremental training.

The training apparatus according to embodiment 1 can be realized using a computer including a processor and a memory. FIG. 1 illustrates one example of a hardware configuration of the training apparatus according to embodiment 1. For example, the training apparatus 100 is a computer such as a PC, and includes a CPU 101, a RAM 102, a HDD 103, a general-purpose interface (I/F) 104, a monitor 108, and a main bus 109. Furthermore, an image-capturing apparatus 105 such as a camera, an input device 106 such as a mouse or a keyboard, and an external memory 107 such as a memory card are connected to the main bus 109 of the training apparatus 100 via the general-purpose I/F 104.

The CPU 101 realizes various types of processes such as those described in the following by operating in accordance with various types of software (computer programs) stored in the HDD 103. First, the CPU 101 causes the monitor 108 to display a user interface (UI) by decompressing an image processing application program stored in the HDD 103 to the RAM 102 and executing the program. Subsequently, various types of data stored in the HDD 103 or the external memory 107, image data acquired by the image-capturing apparatus 105, user instructions from the input device 106, etc., are transferred to the RAM 102. Furthermore, in accordance with the processing by the image processing application, computation processing in which the data stored in the RAM 102 is used is performed based on instructions from the CPU 101. The results of the computation processing can be displayed on the monitor 108 and can be stored to the HDD 103 or the external memory 107. Note that image data stored in the HDD 103 or the external memory 107 may be transferred to the RAM 102. Furthermore, image data transmitted from a server via an unillustrated network may be transferred to the RAM 102.

In the following, an embodiment will be described in which, in the training apparatus 100 having a configuration as described above, a neural network is trained based on instructions from the CPU 101. The functions of the units described in the following and illustrated in FIG. 2 for example can be realized by a processor such as the CPU 101 executing programs stored in a memory such as the RAM 102 or the HDD 103.

In the present embodiment, as a neural network, a demosaicing network model is used. A demosaicing network model refers to the architecture and parameters (coefficients) of the neural network. While a neural network based on a multilayer CNN as described above is used as a demosaicing network model in the present embodiment, the neural-network architecture is not limited to that based on a CNN.

Furthermore, in the present embodiment, a case will be described in which a model for performing a demosaicing process on RAW image data is trained. That is, as mosaic image data, RAW image data in which each pixel has a pixel value corresponding to one of the colors R. G, and B is used. On the other hand, the mosaic image data may be data of pixel values of an image, for each of one or more planes, the image having periodically repeating pixels which set pixel values and pixels without set pixel values (for example, data of each of the R, G. and B planes based on a Bayer pattern). In the following, description will be provided on the presumption that the RAW image data has been captured using a Bayer-pattern color filter in which each pixel has information for one color. However, the present invention is also applicable to RAW images captured using color filters having other patterns.

Figure 2:
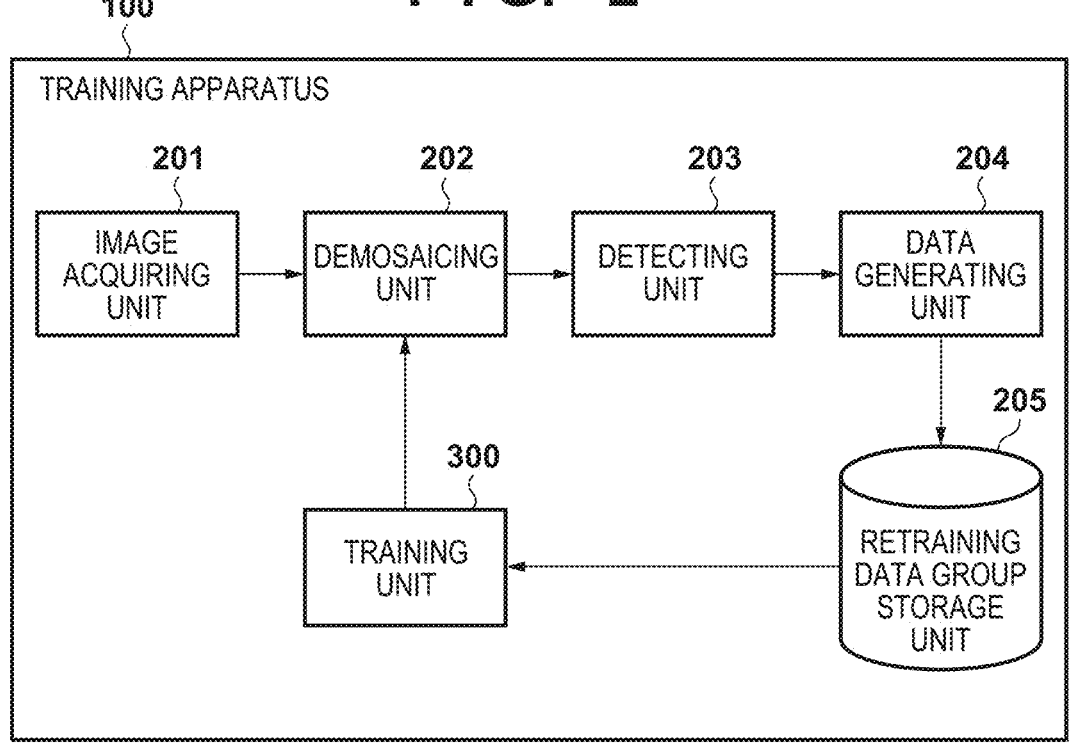
FIG. 2 is a block diagram illustrating an example of a functional configuration of the training apparatus according to an embodiment.

FIG. 2 is a block diagram illustrating an example of a functional configuration of the training apparatus 100 according to the present embodiment. As illustrated in FIG. 2, the training apparatus 100 includes an image acquiring unit 201, a demosaicing unit 202, a detecting unit 203, a data generating unit 204, and a training unit 300. Furthermore, the training apparatus 100 may include a storage unit 205 that stores training images. Note that the configurations illustrated in FIGS. 2 to 4 and FIG. 10 can be modified or altered as appropriate. For example, one functional unit may be split up into a plurality of functional units, or two or more functional units may be integrated into one functional unit. Furthermore, the configurations illustrated in FIGS. 2 to 4 and FIG. 10 may be realized using two or more apparatuses. In this case, the apparatuses can realize the later-described processes by being connected via a circuit or a wired or wireless network and cooperatively operating while performing data communication with one another.

Figure 3:
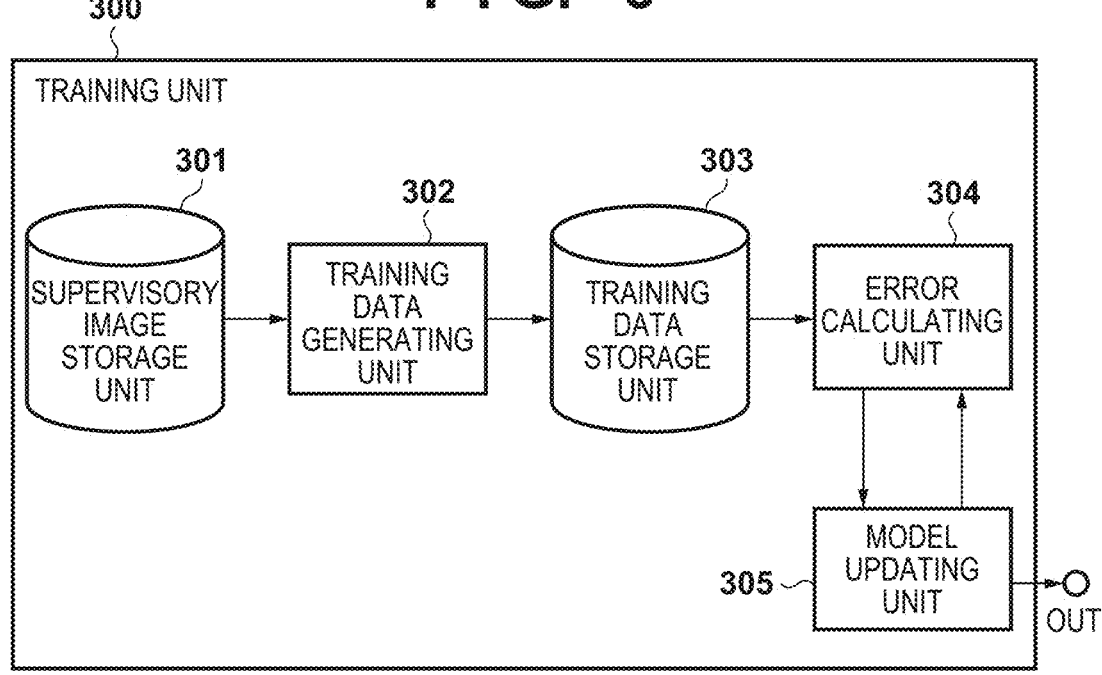
FIG. 3 is a block diagram illustrating an example of a functional configuration of a training unit 300.

First, an example of a functional configuration of the training unit 300 will be described with reference to FIG. 3. The training unit 300 includes a supervisory image storage unit 301, a training data generating unit 302, a training data storage unit 303, an error calculating unit 304, and a model updating unit 305. The training unit 300 trains a neural network for performing a demosaicing process using training data sets generated from supervisory image data.

The supervisory image storage unit 301 stores a plurality of pieces of supervisory image data. As the supervisory image data, data of any image can be used. For example, the supervisory image storage unit 301 may store various types of image data, such as nature photographs including landscapes or animals, human photographs such as portraits or sports photographs, and artificial object photographs including architecture or products. In the present embodiment, the supervisory image data has the color channels R, G, and B. As supervisory images, images without many image defects caused by a demosaicing process that have been obtained by subjecting RAW image data to a size-reduction process without performing a demosaicing process can be used, for example.

Figure 5A:
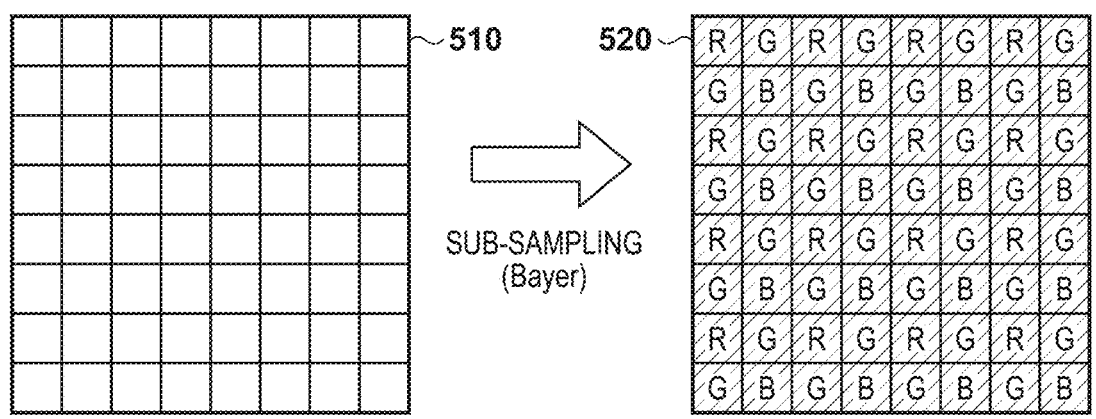

Based on the plurality of pieces of supervisory image data, the training data generating unit 302 generates training data sets including a plurality of pairs of mosaic image data (training input image data) and supervisory image data. The training data generating unit 302 can generate mosaic image data by sampling each piece of supervisory image data stored in the supervisory image storage unit 301 based on a color filter pattern. In such a manner, mosaic image data having the same data format as mosaic image data to be input to the neural network can be generated. The generated training data sets are stored to the training data storage unit 303. FIG. 5A illustrates an example in which, by subsampling a supervisory image 510 (RGB image) based on a Bayer pattern, a training input image 520 (mosaic image) having the Bayer pattern is generated. Furthermore, FIG. 5B illustrates a pair 530 of the supervisory image 510 and the training input image 520 stored in the training data storage unit 303. On the other hand, the training data storage unit 303 may store only a group of supervisory image data. In this case, the error calculating unit 304 can generate a group of training input image data from the supervisory image data.

The error calculating unit 304 calculates an error in the output from the neural network. Specifically, the error calculating unit 304 extracts a set of supervisory image data and training input image data from the training data storage unit 303, and inputs the training input image data to the demosaicing network to acquire a result of the demosaicing process. Next, the error calculating unit 304 compares the result (demosaic image) output from the demosaicing network and the supervisory image data, and calculates an error between the output result and the supervisory image data. The loss function shown in Formula (3) can be used for the calculation of the error.

The model updating unit 305 updates the parameters of the neural network in a manner such that the error calculated by the error calculating unit 304 is fed back. For example, the model updating unit 305 can update the model parameters of the demosaicing network using backpropagation.

The error calculating unit 304 and the model updating unit 305 can repeatedly update the parameters of the neural network using the sets of training input image data and supervisory image data stored in the training data storage unit 303. The updating of parameters is repeated until a predetermined condition is satisfied based on the selected optimization technique, and the trained model that is obtained is output.

On the other hand, the image acquiring unit 201 illustrated in FIG. 2 acquires a test mosaic image. While the test mosaic image can be generated in a similar way as the above-described training input images, the test mosaic image may be an image different from the training input images. For example, the test mosaic image can be generated by performing a sampling process on a test image having the channels R, G, and B in which a symbol or a figure is drawn and which is made up of a combination of various hues. The test image may be an image made up of a symbol or figure portion having one color and a background portion having a different color.

The demosaicing unit 202 generates a test demosaic image by subjecting the test mosaic image to a demosaicing process in which a neural network is used. The trained model obtained by the training unit 300 is used as the neural network.

The detecting unit 203 detects a region (defect region) that is a low-image-quality portion in the test demosaic image. Especially, in a demosaicing process in which a neural network is used, a false pattern such as a checkered pattern is likely to occur. Thus, as a low-image-quality portion, the detecting unit 203 can detect a region having a predetermined pattern such as a checkered pattern from the test demosaic image. The specific detection method will be described later. In the following, a region detected by the detecting unit 203 is called a detected region.

Figure 4:
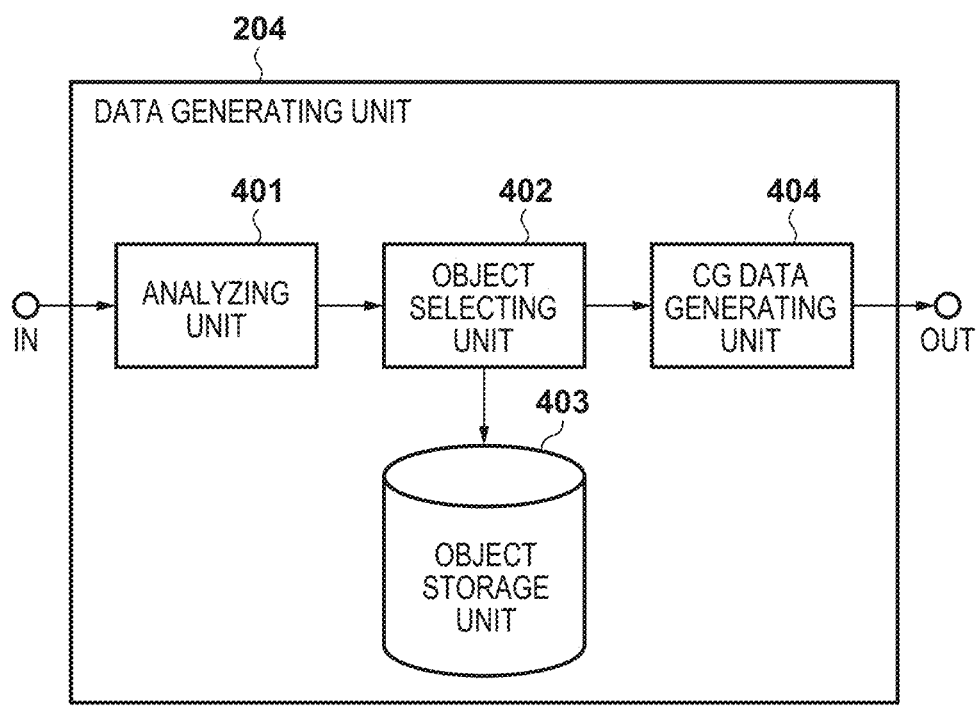
FIG. 4 is a block diagram illustrating an example of a functional configuration of a data generating unit 204.

The data generating unit 204 acquires a training image including a region having a hue similar to the hue of the detected region detected by the detecting unit 203. A functional configuration of the data generating unit 204 is illustrated in FIG. 4. The data generating unit 204 illustrated in FIG. 4 includes an analyzing unit 401, an object selecting unit 402, an object storage unit 403, and a CG data generating unit 404. In the present embodiment, the data generating unit 204 generates, as a training image, CG data having a hue similar to the hue of the detected region detected by the detecting unit 203, and stores the CG data (training image) in the storage unit 205. In the present specification, a hue similar to the detected region refers to a hue within a predetermined angular threshold from the hue angle of the detected region.

The present inventor found out that, in a demosaicing process in which a neural network or deep learning is used, an image defect such as a false pattern is likely to occur in a region having a specific hue. In view of this, in the present embodiment, a training image including a region having a hue for which a defect is likely to occur in the demosaicing process in which the trained model is used is generated, and the trained model is incrementally trained using the training image. Such an incremental training is expected to suppress an image defect such as a false pattern when the demosaicing process is performed on a mosaic image having the specific hue described above.

The analyzing unit 401 analyzes the hue of the detected region detected by the detecting unit 203. In the present embodiment, the analyzing unit 401 analyzes a hue distribution of the detected region.

The object selecting unit 402 acquires object data from the object storage unit 403. The object data is object information indicating a shape of an object (a figure, symbol, character, repetitive pattern, or the like). The object storage unit 403 stores object data for a plurality of objects. The object selecting unit 402 can randomly select one of the plurality of pieces of object data stored in the object storage unit 403. The objects are not limited to those of a particular kind. However, in order to effectively improve the accuracy of the neural network, objects which include one or more connected pixel regions and in which each connected region has a size larger than the filter size of the neural network used for the demosaicing process can be used. Furthermore, the accuracy of the neural network can also be effectively improved by using various objects each having a different periphery (edge shape). This edge shape corresponds to the shape of the periphery between two kinds of hues in CG data generated by the later-described CG data generating unit 404.

The CG data generating unit 404 generates CG data based on the result of the analysis of the hue distribution by the analyzing unit 401 and the object data selected by the object selecting unit 402, and stores the generated CG data in the storage unit 205. This CG data includes an object, and the object has a hue similar to the hue of the detected region.

The training unit 300 can incrementally train the neural network using the training image obtained by the data generating unit 204. For example, the training unit 300 can store, in the supervisory image storage unit 301, the CG data stored in the storage unit 205. Furthermore, the training unit 300 can incrementally train the trained model using the CG data stored in the supervisory image storage unit 301 as supervisory image data.

(Flow of Image Processing)

Figure 6A:
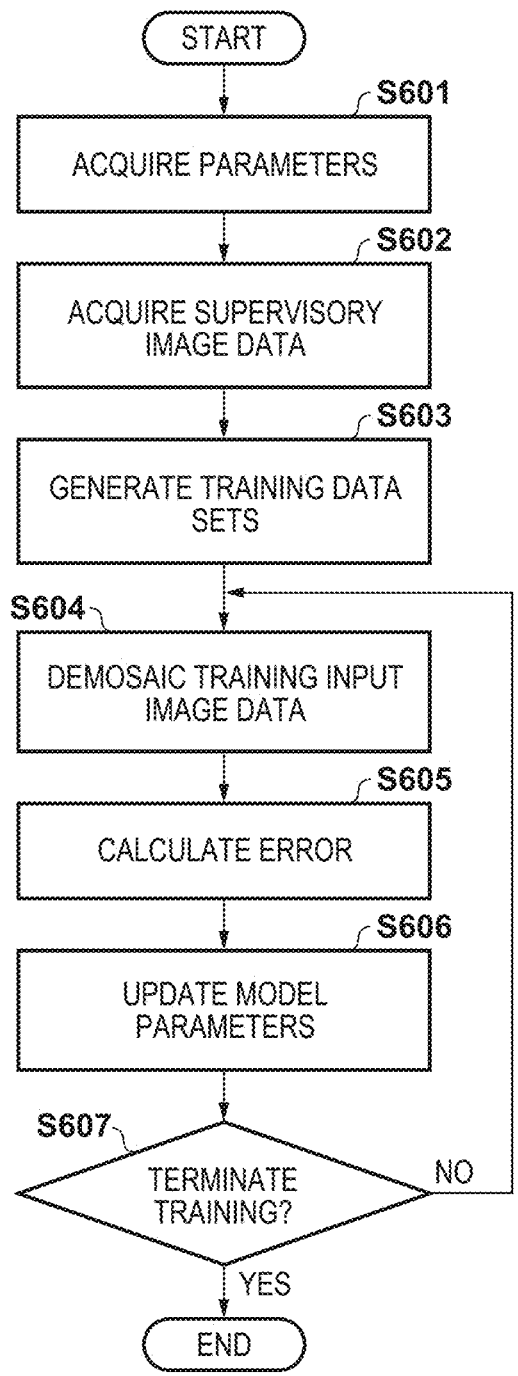
FIGS. 6A and 6B are flowcharts illustrating a flow of training processing according to an embodiment.

The processes performed by the training apparatus 100 according to the present embodiment will be described with reference to the flowchart in FIGS. 6A and 6B. The processes in the flowchart illustrated in FIGS. 6A and 6B can be realized by a processor such as the CPU 101 executing programs stored in a memory such as the RAM 102 or the HDD 103.

First, one example of a training process will be described with reference to FIG. 6A. In step S601, the training unit 300 acquires various parameters that are necessary for demosaic training. The parameters can include initial values of parameters of the neural network, and hyper parameters indicating the structure and optimization method of the neural network. Note that, when the neural network is to be incrementally trained as described later, the training unit 300 can acquire parameters of the trained model to be subjected to the incremental training.

In step S602, as described above, the training data generating unit 302 acquires a group of supervisory image data from the supervisory image storage unit 301. In step S603, as described above, the training data generating unit 302 generates training data sets including the group of supervisory image data and a group of training input image data using the group of supervisory image data acquired in step S602.

In step S604, as described above, the error calculating unit 304 performs a demosaicing process on training input image data included in the training data sets generated in step S603. In step S605, as described above, the error calculating unit 304 calculates, according to the loss function shown in Formula (3), an error based on supervisory image data and the demosaic image data acquired in step S604.

In step S606, as described above, the model updating unit 305 updates parameters of the model being trained in accordance with the error acquired in step S605. In step S607, the training unit 300 determines whether or not training is to be terminated. For example, the training unit 300 can determine that training is to be terminated if the number of times the parameters have been updated has reached a predetermined number of times. If training is not to be terminated, processing returns to step S604, where training is performed using different training input image data and supervisory image data.

Subsequently, one example of an incremental training process will be described with reference to FIG. 6B. Note that the process in FIG. 6B can be performed on each of a plurality of test mosaic images acquired by the image acquiring unit 201.

In step S609, as described above, the image acquiring unit 201 acquires a test mosaic image. The image acquiring unit 201 may generate a mosaic image by acquiring test RGB image data from the HDD 103, the external memory 107, or the like, and performing a sampling process on the RGB image data. The image acquiring unit 201 may perform preprocessing such as a white balance process or an offset-adding process on the test mosaic image data.

Figures 7A, 7B:
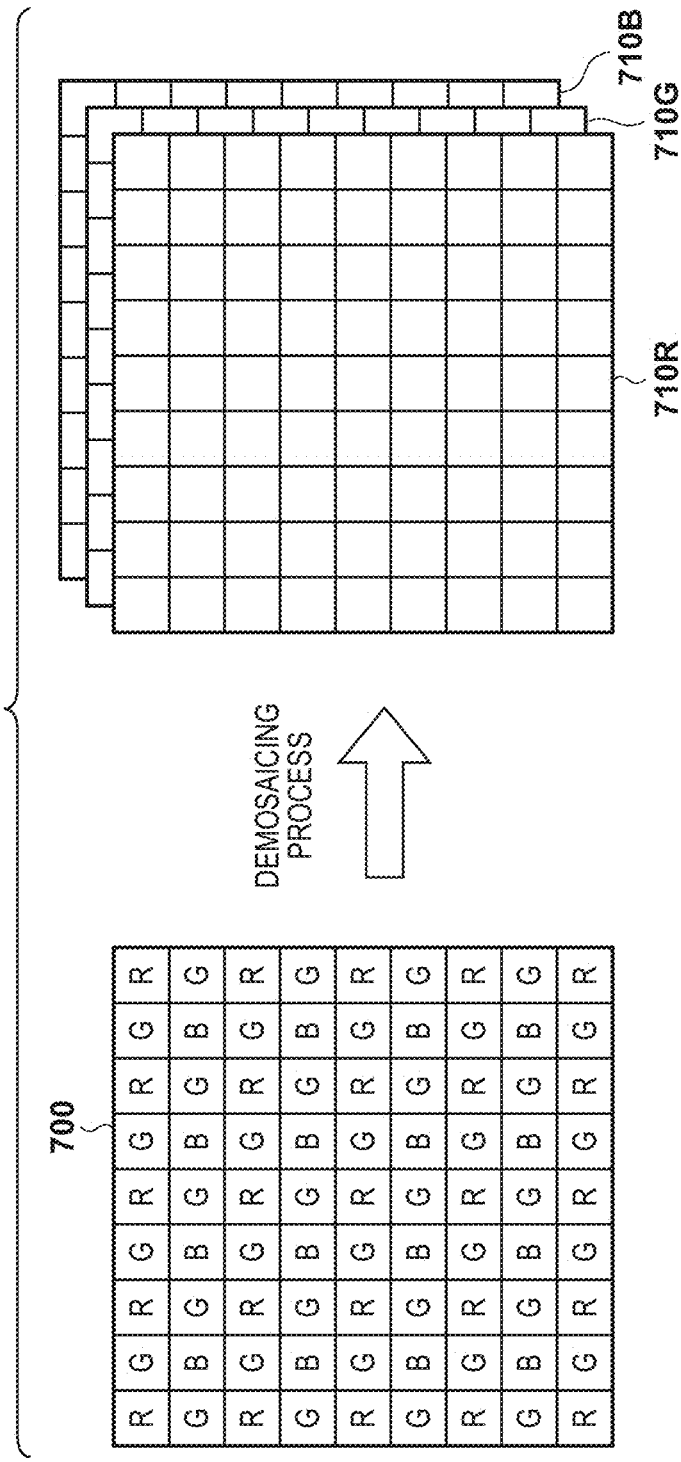
FIGS. 7A and 7B are diagrams for describing a process for detecting a predetermined pattern.

In step S610, as described above, the demosaicing unit 202 outputs test demosaic image data in which color information has been interpolated by performing a first demosaicing process in which the trained model output by the training unit 300 is used. For example, as illustrated in FIG. 7A, demosaic image data is obtained by the demosaicing process being performed on mosaic image data 700. Furthermore, demosaic image data 710R, 710G, and 710B for the respective colors R, G, and B is obtained by splitting the demosaic image data into the three channels R. G, and B.

In step S611, the detecting unit 203 detects, from the test demosaic image, a defect region in which an image defect is present. By using a spatial filter, the detecting unit 203 can detect a region in which a specific pattern is present as a defect region. In the following, a spatial filter that detects image defects is referred to as a detection filter.

The present inventor found out that, when a mosaic image that is based on a predetermined color pattern is subjected to a demosaicing process using a neural network, a false pattern that is correlated with the predetermined color pattern is likely to occur. For example, when a mosaic image that is based on a Bayer pattern is subjected to a demosaicing process as described above, a checkered false pattern that is correlated with the Bayer pattern is likely to occur. Thus, in this example, the detecting unit 203 detects, as the specific pattern, a pattern (for example, a checkered pattern) that is correlated with a predetermined color pattern. In order to detect such a pattern, a detection filter in which filter coefficients correlated with the Bayer pattern are set can be used. FIG. 7B illustrates a 5×5 sized filter that is one example of such a detection filter. However, the size and coefficients of the detection filter are not particularly limited, and a filter having a size of 3×3 or larger can be used, for example. Also, in place of the detection filter illustrated in FIG. 7B, in which 4 or −4 are set as coefficients, a detection filter in which positive and negative values are repeated every other pixel in each of the vertical and horizontal directions may be used. Furthermore, the coefficients in the defect detection filter may be set so that values toward the center are greater and values toward the ends are smaller.

The detecting unit 203 can apply the detection filter to each of the demosaic image data 710R, 710G, and 710B. Thus, the detecting unit 203 can generate, for each channel, a map indicating the intensity of the specific pattern. Furthermore, the detecting unit 203 can detect a defect region based on the intensity of the specific pattern detected for each of the channels R, G, and B. Here, noise such as isolated points may occur in the maps, and in order to prevent such noise from being detected as defect regions, the detecting unit 203 can apply a noise removal filter to the map for each channel. A median filter can be used as the noise removal filter.

Furthermore, for each pixel, the detecting unit 203 can extract the minimum value among intensities of the specific pattern in the channels and compare the minimum value with a preset threshold th (for example, th=100). If the minimum value detected for a pixel is greater than or equal to the threshold th, the pixel can be determined as belonging to a defect region.

In step S612, the detecting unit 203 determines whether or not a defect region has been detected from the test demosaic image. Processing proceeds to step S613 if a defect region has been detected, and otherwise proceeds to End.

In step S613, the data generating unit 204 analyzes a hue distribution of the detected region detected in step S611, and generates CG data based on the analysis result. Specifically, the analyzing unit 401 first extracts a hue angle (H: 0-180°; 0°=180°) by converting, from the RGB color space into the HSV color space, the color value of the detected region detected in step S611 from the test demosaic image, and records the extracted hue angle to the hue information file. Note that, if the detected region includes a plurality of colors, the analyzing unit 401 can create a histogram of hue angles of the pixels in the detected region, and record the most frequently appearing hue angle.

FIG. 8 is a diagram illustrating one example of the hue information file. In the hue information file, the hue angle of the detected region (hue 1) and a hue angle (hue 2) other than the hue angle of the detected region can be recorded. Furthermore, the number of combinations of the hues 1 and 2 recorded in the hue information file may be the product of a preset number Num (for example, Num=35) and the number of detected regions. In such a configuration, the hue 2 may be any angle that is different from the hue 1. In FIG. 8, the number of detected regions is three. Data numbers are recorded in ascending order in the left column, the hue 1 is recorded in the center column, and the hue 2 is recorded in the right column. In the example in FIG. 8, the hue 2 is selected so that hues 2 are equally distributed within the range of 0-180°, and in specific, the hue 2 is an angle indicated by hue 1+i×5° (where i is an integer other than zero). Here, in order to avoid the hue 1 from overlapping, recording may be skipped if the hue angle of the detected region is a hue angle already recorded in the hue information file.

Next, as described above, the object selecting unit 402 randomly selects object data from the object storage unit 403.

Then, the CG data generating unit 404 generates CG data based on the hue information file generated by the analyzing unit 401 and the object data selected by the object selecting unit 402. The CG data generating unit 404 can generate the CG data so as to include a foreground object (symbol or the like) having a color with the hue 1 and a background having a color with the hue 2. Conversely, the CG data may have an object having a color with the hue 2 and a background with the hue 1. In such a manner, the CG data generating unit 404 can generate CG data including a combination of the hues 1 and 2 indicated in the hue information file. Note that the specific color with the hue 1 and the specific color with the hue 2 can be selected as appropriate. The CG data generating unit 404 can generate pieces of CG data corresponding to a plurality of combinations of the hues 1 and 2, and each piece of CG data may be generated based on different object data. The CG data generating unit 404 stores the generated CG data to the storage unit 205.

According to the above-described configuration, the data generating unit 204 can generate a plurality of pieces of CG data based on the hue 1 recorded for one detected region. Here, each piece of CG data includes an object and a background. Furthermore, while the plurality of pieces of CG data have an object hue similar to the hue (hue 1) of the detected region, the plurality of pieces of CG data have mutually different background hues (hue 2).

Figure 9C:
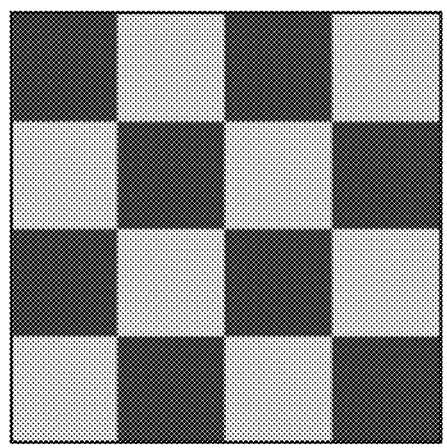
FIGS. 9A to 9C are diagrams illustrating one example of CG data to be used for incremental training.
Figure 9B:
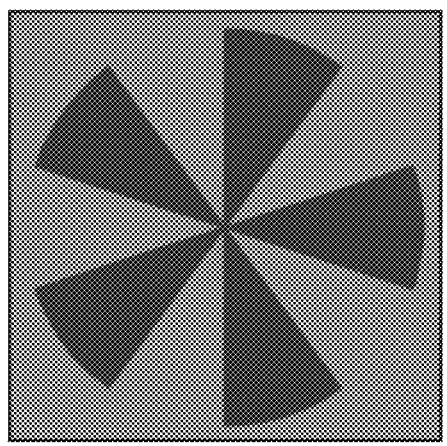
Figure 9A:
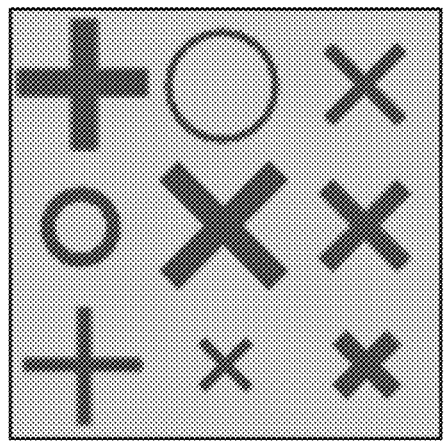

FIGS. 9A to 9C illustrate one example of CG data generated by the CG data generating unit 404. FIGS. 9A, 9B, and 9C respectively indicate CG data generated using object data of a symbol, object data of a figure, and object data of a repetitive pattern. As a matter of course, the objects are not limited to the shapes illustrated in FIGS. 9A to 9C, and may be other symbols, figures, characters, or repetitive patterns.

In step S614, the training unit 300 incrementally trains the neural network using, as supervisory image data, the CG data generated in step S613, which is a training image. The incremental training can be performed in accordance with FIG. 6A. That is, the training unit 300 inputs to the neural network (step S604) a mosaic image obtained by performing a sampling process (step S603) on the training image. Then, the training unit 300 calculates an error between the training image and the output from the neural network (step S605), and incrementally trains the neural network based on this error (step S606). This incremental training can be performed based on the trained model using the same network structure as that when the trained model was generated. In step S602 in the incremental training, the training data generating unit 302 uses the CG data stored in the storage unit 205 as supervisory image data. Meanwhile, in the incremental training, the CG data stored in the storage unit 205 may be added to the group of supervisory image data stored in the supervisory image storage unit 301, and both such data may be used as supervisory image data.

Figure 6B:
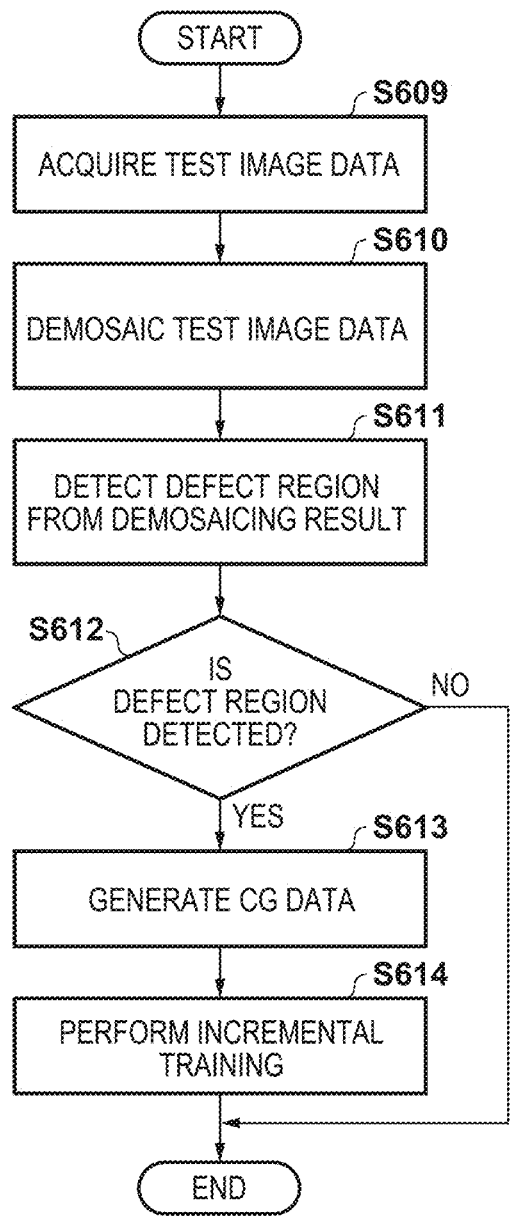

The incremental training process illustrated in FIG. 6B can be repeated until a predetermined condition is satisfied. For example, the incremental training process can be performed until defect regions are no longer detected, or only for a predetermined number of times.

Note that, a defect region has been detected using a detection filter in step S611. However, a region in which the pixel-by-pixel difference between the test mosaic image acquired in step S609 and the test demosaic image acquired in step S610 is greater than a predetermined threshold may be detected as a defect region. Since the a false pattern is likely to be occurring also in a detected region that is a low-image-quality portion specified in such a manner, the occurrence of a false pattern in the demosaicing process in which the trained model is used can be suppressed by performing incremental training in accordance with the detection result.

Furthermore, in the above-described embodiment, the number of combinations of the hues 1 and 2, or that is, the number of pieces of CG data that are generated, is the product of the number Num and the number of detected regions. In such a manner, the data generating unit 204 can determine the number of training images to be acquired in accordance with the number of detected regions detected by the detecting unit 203. However, the method for determining the number of training images is not limited to this method. For example, the data generating unit 204 may determine the number of training images to be acquired in accordance with the number of supervisory images that were used to train the neural network. Specifically, the data generating unit 204 can determine the number of pieces of CG data in accordance with the number of pieces of supervisory image data that were used to create the trained model. For example, the number of combinations of the hues 1 and 2 may be a number that is obtained by multiplying the number of pieces of supervisory image data by a predetermined coefficient (for example 1%).

Furthermore, while image data including a color with the hue angle (hue 1) of the detected region and a color with a hue angle other than the hue angle of the detected region has been generated in step S613, the specific generation method is not limited to the above-described method. For example, the data generating unit 204 may generate an image including a region having a hue similar to the hue of the detected region by performing image processing on a supervisory image that was used to train the neural network. As a specific example, the data generating unit 204 can process supervisory image data extracted from the group of supervisory image data stored in the supervisory image storage unit 301 and use the processed supervisory image data for the incremental training. For example, the data generating unit 204 can perform a binarization process on a certain number of pieces of supervisory image data extracted from the group of supervisory image data, and allocate a color with the hue 1 and a color with the hue 2 to a region having a first pixel value and a region having a second pixel value, respectively. By using such a method as well, image data for incremental training including a color with the hue angle (hue 1) of the detected region and a color with a hue angle other than the hue angle of the detected region can be generated.

Furthermore, the image data for incremental training need not be made up of only two colors. For example, in the CG data generated by the data generating unit 204, the background may include a plurality of colors that do not have the hue 1, while the color of the foreground object has the hue angle (hue 1) of the detected region. As another method, the data generating unit 204 may select, from the supervisory images that were used to train the neural network, an image including a region having a hue similar to the hue of the detected region as an image for the incremental training. For example, the data generating unit 204 may collect pieces of supervisory image data including colors with hues similar to the hue 1 from the supervisory image storage unit 301, and perform incremental training using the collected supervisory image data. Also, the data generating unit 204 may collect pieces of supervisory image data including combinations of the hues 1 and 2. Furthermore, noise may be added to object shape information or to image data for incremental training. On the other hand, in order to perform the incremental training efficiently, the data generating unit 204 can generate image data with a hue histogram exhibiting a bimodal shape.

Furthermore, the present inventor found out that an image defect such as a false pattern is likely to occur especially if some regions of an image have a specific hue and a different region of the image has a different specific hue. Thus, the analyzing unit 401 may detect a combination of the hue of the detected region and a hue of a region other than the detected region from the test demosaic image data, and record the combination of hues. In this case, the analyzing unit 401 may create a histogram of hue angles of pixels outside the detected region, and record the most frequently appearing hue angle as the above-described hue 2. According to such a method, the data generating unit 204 can generate CG data for incremental training including an object and a background. Here, the object hue is similar to the hue (hue 1) of the detected region, and the background hue is set based on the color (hue 2) of a region of the demosaic image other than the detected region. According to such a method, it can be expected that incremental training of the neural network can be performed more efficiently.

According to the present embodiment described above, the occurrence of a false pattern in a demosaicing process in which a trained model is used can be suppressed by subjecting a neural network to incremental training using an image having a color similar to the color of a region in which a false pattern occurs.

Embodiment 2

An image processing apparatus according to embodiment 2 performs a demosaicing process (inference process) on a mosaic image using the trained model output by the training apparatus according to embodiment 1. In the following, an example in which the demosaicing process is performed on RAW image data (mosaic image data) based on a Bayer pattern will be described.

Figure 10:
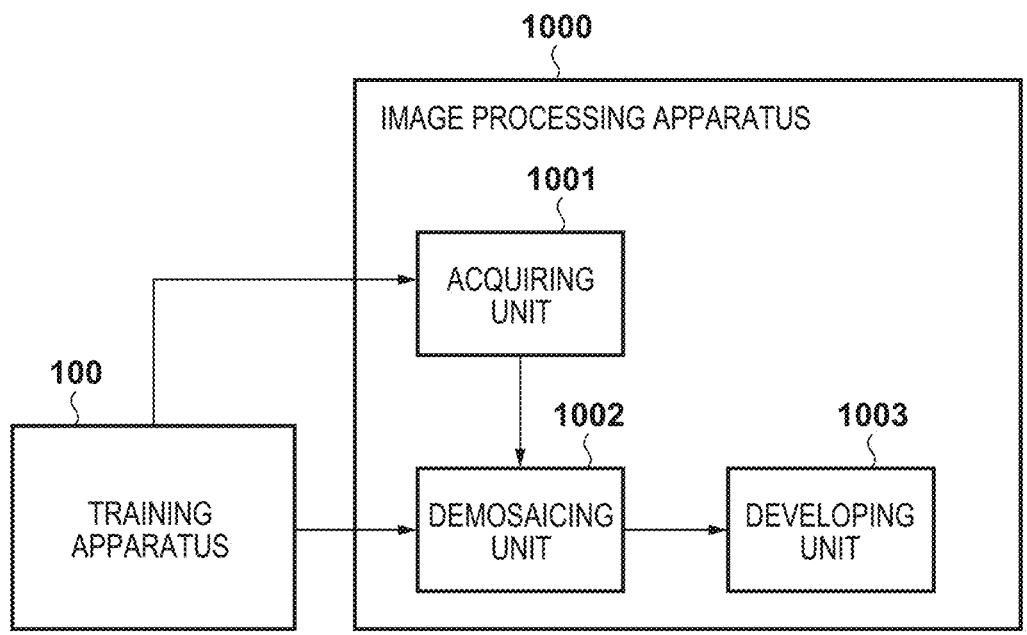
FIG. 10 is a block diagram illustrating an example of a functional configuration of an image processing apparatus according to an embodiment.

FIG. 10 is a block diagram illustrating an example of a functional configuration of an image processing apparatus 1000 according to the present embodiment. The image processing apparatus 1000 according to the present embodiment 1 can also be realized using a computer including a processor and a memory, as illustrated in FIG. 1. The image processing apparatus 1000 includes an acquiring unit 1001, a demosaicing unit 1002, and a developing unit 1003.

The acquiring unit 1001 acquires mosaic image data. The demosaicing unit 1002 subjects the mosaic image data acquired by the acquiring unit 1001 to the demosaicing process using the incrementally trained neural network output by the training apparatus 100 according to embodiment 1, and outputs demosaic image data in which color information has been interpolated. The developing unit 1003 subjects the demosaic image data to a development process, and outputs a development process result.

Figure 11:
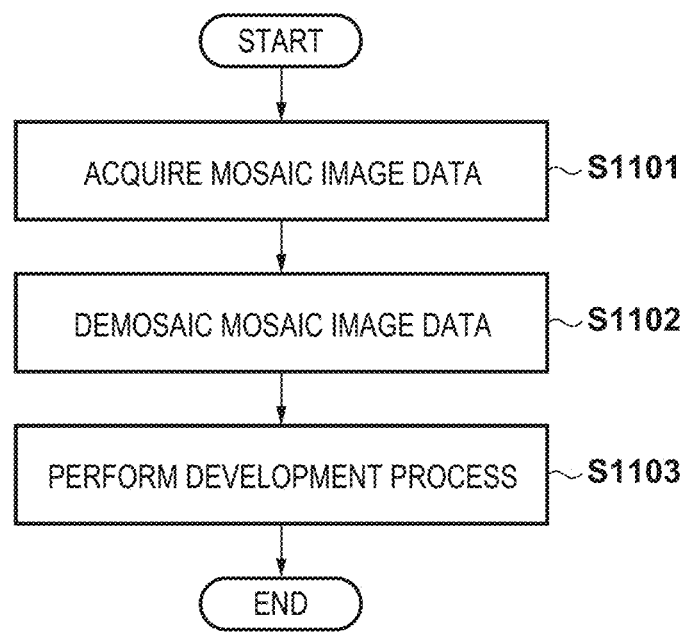
FIG. 11 is a flowchart illustrating a flow of image processing according to an embodiment.

Next, the processes performed by the image processing apparatus 1000 according to the present embodiment will be described with reference to the flowchart in FIG. 11. In step S1101, the acquiring unit 1001 acquires RAW image data from the image-capturing apparatus 105, the HDD 103, the external memory 107, or the like. Furthermore, the acquiring unit 1001 performs preprocessing such as a white balance process or an offset-adding process on the RAW image data.

In step S1102, the demosaicing unit 1002 subjects the RAW image data preprocessed in step S1101 to the demosaicing process using the trained model trained by the training apparatus 100, and outputs a demosaic image in which color information has been interpolated.

In step S1103, the developing unit 1003 outputs a development process result by subjecting the demosaic image data output in step S1102 to the development process. The development process is not limited to that of a particular type, but may be one or more among a noise reduction process, a dynamic-range adjustment process, a gamma correction process, a sharpness process, and a color adjustment process, for example. The destination to which the result is output is not particularly limited, and may for example be the HDD 103, the external memory 107, or another device that is connected to the general-purpose I/F 104 (for example, an external device connected to the image processing apparatus 1000 via a network).

As described above, according to the present embodiment, a demosaicing process is performed on a mosaic image using an incrementally trained neural network output by the training apparatus according to embodiment 1. Thus, the occurrence of an image defect such as a false pattern can be suppressed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-105035, filed Jun. 24, 2021, which is hereby incorporated by reference herein in its entirety.

What is claimed is:

1. A convolutional neural network (CNN) based training apparatus for performing a demosaicing process comprising one or more processors and one or more memories storing one or more programs which cause the one or more processors to:
   acquire a mosaic image;
   generate a demosaic image by subjecting the mosaic image to the demosaicing process in which the convolutional neural network is used;
   detect, as a detected region, a region including a false pattern based on a minimum value of an intensity of a specific pattern detected by applying a spatial filter to each of RGB (Red, Green, and Blue) channels in the demosaic image, wherein positive and negative values are repeated alternately every other pixel in each of the vertical and horizontal directions in the spatial filter, the intensity being degree of the specific pattern in each of the RGB channels;
   acquire a training image including a region having a hue similar to a hue of the detected region including the false pattern;
   store the training image in a supervisory image storage unit; and
   incrementally train the convolutional neural network based on an error between the training image stored in the supervisory image storage unit and an output that is obtained by inputting, to the neural network, a mosaic image obtained by performing a sampling process on the training image.

2. The training apparatus according to claim 1, wherein the specific pattern is a checkered pattern.

3. The training apparatus according to claim 1, wherein: the mosaic image is a RAW image that is based on a predetermined color pattern, and the specific pattern is a pattern that is correlated with the predetermined color pattern.

4. The training apparatus according to claim 1, wherein
   the one or more programs cause the one or more processors to generate the training image, which includes an object, and
   the object has a hue similar to the hue of the detected region.

5. The training apparatus according to claim 4, wherein the one or more programs cause the one or more processors to acquire object information indicating a shape of the object from a storage storing a plurality of pieces of object information.

6. The training apparatus according to claim 1, wherein
   the one or more programs cause the one or more processors to generate a plurality of the training images, each of which includes an object and a background,
   in the plurality of training images, the object has a hue similar to the hue of the detected region, and
   the background has a different hue among the plurality of training images.

7. The training apparatus according to claim 1, wherein
   the one or more programs cause the one or more processors to generate the training image, which includes an object and a background,
   the object has a hue similar to the hue of the detected region, and
   the background has a hue that is set based on a color of a region of the demosaic image other than the detected region.

8. The training apparatus according to claim 1, wherein the one or more programs cause the one or more processors to select, as the training image, an image including a region having a hue similar to the hue of the detected region from supervisory images that were used to train the neural network.

9. The training apparatus according to claim 1, wherein the one or more programs cause the one or more processors to generate an image including a region having a hue similar to the hue of the detected region by performing image processing on a supervisory image that was used to train the convolutional neural network.

10. The training apparatus according to claim 1, wherein the one or more programs cause the one or more processors to determine the number of the training images to be acquired in accordance with the number of the detected regions that are detected or in accordance with the number of supervisory images that were used to train the convolutional neural network.

11. A convolutional neural network (CNN) based training method for performing a demosaicing process comprising:
    acquiring a mosaic image;
    generating a demosaic image by subjecting the mosaic image to the demosaicing process in which the convolutional neural network is used;
    detecting, a low-image-quality portion in the demosaic image as a detected region, a region including a false pattern based on a minimum value of an intensity of a specific pattern detected by applying a spatial filter to each of RGB (Red, Green, and Blue) channels in the demosaic image, wherein positive and negative values are repeated alternately every other pixel in each of the vertical and horizontal directions in the spatial filter, the intensity being degree of the specific pattern in each of the RGB channels;
    acquiring a training image including a region having a hue similar to a hue of the detected region including the false pattern;
    storing the training image in a supervisory image storage unit; and incrementally train the convolutional neural network based on an error between the training image stored in the supervisory image storage unit and an output that is obtained by inputting, to the neural network, a mosaic image obtained by performing a sampling process on the training image.

12. A non-transitory computer-readable medium storing one or more programs which, when executed by a computer comprising one or more processors and one or more memories, cause the computer to perform a convolutional neural network (CNN) based training method for performing a demosaicing process comprising:

acquiring a mosaic image;

generating a demosaic image by subjecting the mosaic image to the demosaicing process in which the convolutional neural network is used;

detecting, a low-image-quality portion in the demosaic image as a detected region, a region including a false pattern based on a minimum value of an intensity of a specific pattern detected by applying a spatial filter to each of RGB (Red, Green, and Blue) channels in the demosaic image, wherein positive and negative values are repeated alternately every other pixel in each of the vertical and horizontal directions in the spatial filter, the intensity being degree of the specific pattern in each of the RGB channels;

acquiring a training image including a region having a hue similar to a hue of the detected region including the false pattern;

storing the training image in a supervisory image storage unit; and incrementally training the convolutional neural network based on an error between the training image stored in the supervisory image storage unit and an output that is obtained by inputting, to the neural network, a mosaic image obtained by performing a sampling process on the training image.

* * * * *